United States Patent [19]  [11] 3,987,762
Sawada  [45] Oct. 26, 1976

[54] ROTARY ENGINE
[75] Inventor: Ryosaku Sawada, Nishinomiya, Japan
[73] Assignee: Kabushiki Kaisha Hanshin Gijutsu Kenkyusho, Japan
[22] Filed: Apr. 1, 1974
[21] Appl. No.: 456,956

[52] U.S. Cl. .................. 123/8.13; 123/8.05; 123/8.09; 123/8.49; 418/178; 418/266
[51] Int. Cl.² .................................. F02B 53/04
[58] Field of Search ............. 123/8.13, 8.45, 8.05, 123/8.07, 8.09, 8.11; 418/265, 266, 178

[56] References Cited
UNITED STATES PATENTS

| | | | |
|---|---|---|---|
| 1,279,195 | 9/1918 | Whitmore | 418/266 UX |
| 1,343,115 | 6/1920 | Current | 418/266 X |
| 1,453,683 | 5/1923 | Kochendarfer | 418/266 |
| 3,008,457 | 11/1961 | Mezzetta | 123/8.35 |
| 3,121,421 | 2/1964 | Peterson | 123/8.13 UX |
| 3,240,189 | 3/1966 | Stumpfig | 123/8.13 |
| 3,545,413 | 12/1970 | Freitas | 418/265 UX |
| 3,596,641 | 8/1971 | Hofmann | 123/8.45 X |
| 3,762,375 | 10/1973 | Bentley | 123/8.13 X |
| 3,805,747 | 4/1974 | Nakagawa | 123/8.13 |

Primary Examiner—Clarence R. Gordon
Attorney, Agent, or Firm—Craig & Antonelli

[57] ABSTRACT

The casing of a rotary engine has a combustion chamber in which a rotor having a precisely circular section is supported by a center shaft. Part of the peripheral wall of the combustion chamber has the same size as the circumference of the rotor and the rest of the wall is larger than the circumference of the rotor. Accordingly, a requisite length of the circumferential surface of the rotor is kept in sliding contact with the peripheral wall all the time, while the rest of the circumferential surface of the rotor is always out of sliding contact with the peripheral wall to provide a space in the combustion chamber. The circumferential surface of the rotor is partially recessed to provide a cavity for accommodating a fuel-air mixture.

18 Claims, 10 Drawing Figures

ROTARY ENGINE

The present invention relates to rotary engines, more particularly, to a rotary engine of very simple construction which is capable of exhibiting a higher performance than conventional engines and contributing to air pollution control.

Various type of rotary engines have heretofore been known; however, the conventional rotary engines comprise a combustion chamber including a rotor disposed therein which have shapes defined by complicated curves and are, therefore, complex in overall construction thereby requiring considerable labor to manufacture.

Moreover, conventional rotary machines are difficult to manufacture with satisfactory accuracy and are incapable of achieving good results in controlling air pollution.

Accordingly, it is an object of the present invention to provide a rotary engine which avoids by simple means the aforementioned shortcomings and drawbacks encountered in the prior art.

A further object of the present invention is to provide a rotary engine which is very simple in overall construction.

A still further object of the present invention is to provide a rotary engine of a simple construction in which a rotor having a precisely circular section is always maintained in sliding contact with a predetermined portion of a peripheral wall of a combustion chamber of the engine casing in which the rotor is disposed.

Another object of the present invention is to provide a rotary engine in which the rotor need not be rotated eccentrically and, consequently, is rotated smoothly thereby minimizing if not completely avoiding the objectionable vibrations encountered in the prior art conventional rotary engines.

Still another object of the present invention is to provide a rotary engine comprising a rotor whose circumferential surface is provided with a cavity for accommodating a fuel-air mixture.

Still another object of the present invention is to provide a rotary engine comprising a rotor whose circumferential surface is provided with an additional cavity for accommodating additional air or the like so as to assure complete combustion of fuel in the combustion chamber with the additional air.

These and further objects, features and advantages of the present invention will become more obvious from the following description when taken in connection with the accompanying drawings which show, for the purpose of illustration only, several embodiments of the present invention, and wherein.

Figure 1:
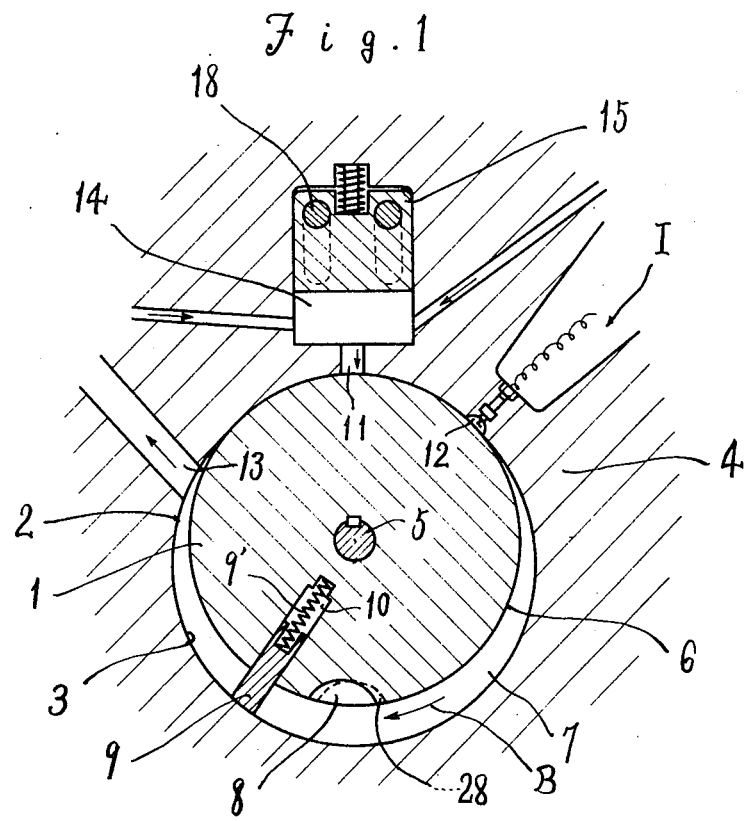
FIG. 1 is a front cross-sectional view showing a first embodiment of the rotary engine according to the present invention.
Figure 2:
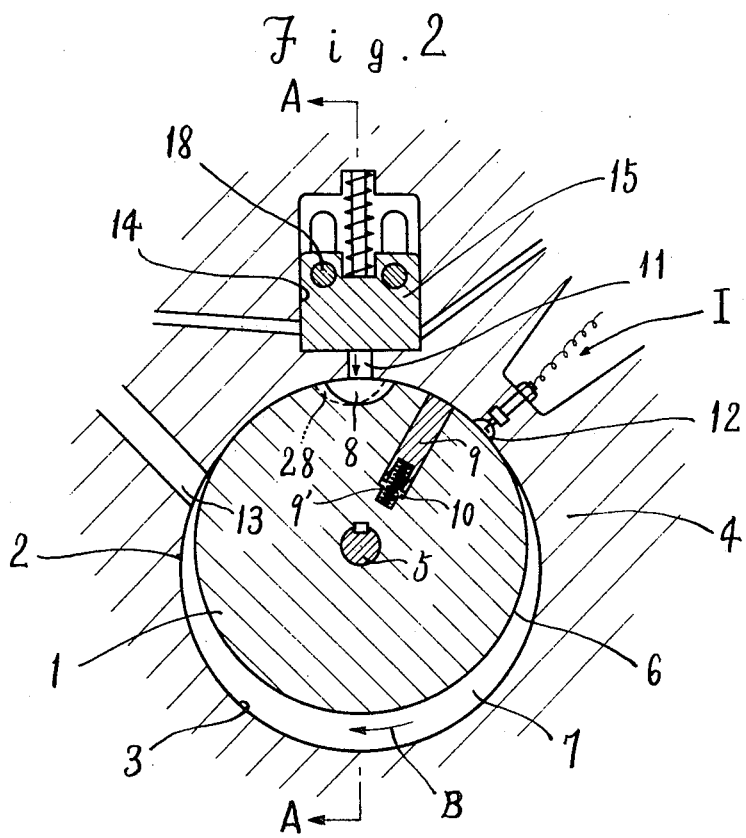
FIG. 2 is a cross-sectional view showing the embodiment of FIG. 1 when taking in a fuel-air mixture.

Referring now to the drawings wherein like reference numerals are used throughout the various views to designate like parts, and more particularly to FIGS. 1–4 thereof, the embodiment illustrated in these four Figures includes a rotor 1 precisely circular in section disposed on a center shaft 5 within a combustion chamber 2 provided in a casing 4. A portion of the peripheral wall 3 of the combustion chamber 2 is of the same circumference as the circumference of the rotor 1, while the circumference of the rest of the wall 3 is greater than the circumference of the rotor 1.

A requisite predetermined length of the circumferential surface 6 of the rotor 1 is adapted for sliding hermetical contact with the portion of the peripheral wall 3 of the combustion chamber which has the same size as the circumference of the rotor 1, while the circumferential surface of the rotor 1 is out of sliding contact with the rest of the peripheral wall 3 all the time thereby providing a space 7.

The circumferential surface of the rotor 1 is recessed to provide a cavity 8 for accommodating a fuel-air mixture and is further formed with a radially directed groove 10 inwardly extending from its circumferential surface 6 toward the center shaft 5.

A partition or sealing member 9 is disposed in the groove 10 so as to be selectively displaceable outwardly and inwardly in the groove 10. A spring 9' or the like resilient member is provided for biasing the partition or sealing member 9 into engagement with the peripheral wall 3 of the combustion chamber 2. In lieu of a spring or resilient member, a centrifugal force may be employed for maintaining one end of the partition member 9 in sliding contact with the peripheral wall 3 of the combustion chamber 2. The partition member 9 is positioned slightly forwardly of the cavity 8 in the direction of rotation of the rotor 1 which is indicated by the arrow B in FIGS. 1 and 2.

The peripheral wall of the combustion chamber 2 is formed with an intake port 11 for admitting a fuel-air mixture or its ingredients, an ignition port 12 and an exhaust port 13. A suitable conventional ignition means generally designated by the reference character I extends into the ignition port 12 to cause selective ignition of the fuel-air mixture.

The intake port 11 and the ignition port 12 are positioned within the area of the peripheral wall where the rotor is in sliding contact with the wall 3. The exhaust port 13 is formed in the portion of the peripheral wall where the space 7 terminates. The distance between the intake port 11 and the ignition port 12, and the distance between the intake port 11 and the exhaust port 13, are each greater than the width of the cavity 8 formed in the circumferential surface 6 of the rotor 1.

To permit the cavity 8 to selectively take in the fuel-air mixture quickly and effectively when the cavity 8 comes to the position of the intake port 11, the cavity 8 communicates through the intake port 11 with a chamber or compartment 14 formed in the casing 4 for storing the fuel-air mixture.

A pusher cam 15 is disposed in the chamber or compartment 14 and is movable upwardly and downwardly by cam means 16, 17 (FIGS. 3, 4) which are operatively connected with and displaceable in dependence upon the position of the rotor 1 so as to selectively force out the fuel-air mixture from the chamber or compartment 14 into the cavity 8 when the cavity is positioned at the intake port 11. Connecting rods 18 are provided to connect the cam means 16, 17 to the pusher cam 15.

To effect perfect combustion and to prevent the exhaust of pollutants, the circumferential surface 6 of the rotor 1 is formed, separately from the fuel-air mixture accommodating cavity 8, with a further cavity 28 for accommodating additional air or the like to dilute the fuel-air mixture and to introduce the same into the space 7 before or after ignition and explosion.

The additional air or the like is supplied to the cavity 28 through a port 31 (FIG. 3) which is formed in the portion of the peripheral wall 3 of the combustion chamber 2 where the rotor 1 is adapted for sliding contact with the wall 3. Like the intake port 11, the supply port 31 communicates with a chamber or compartment 24 having a pusher cam 25 operatively connected with and displaceable in dependence upon the position of the rotor 1. The cavity 28 is disposed in the rotor 1 in such a position that it is completely out of communication with the ignition port 12.

The embodiment described hereinabove operates in the following manner. When the fuel-air mixture accommodating cavity 8 in the circumferential surface 6 of the rotor 1 comes to the position of the intake port 11 in the peripheral wall 3 of the combustion chamber 2, the pusher cam 15 forces the fuel-air mixture into the cavity 8 through the intake port 11 thereby filling the cavity 8 with the compressed fuel-air mixture.

Subsequently, the rotor 1 rotates to bring the cavity 8 to the position of the ignition port 12, where the fuel-air mixture is ignited by the ignition means 1 for explosion and starts to expand. The expanded combustion gas goes into the space 7 but is prevented from immediate exhaust by the sealing or partition member 9, which in turn causes the combustion gas to progressively spread out through the space 7 thereby prolonging the combustion time to the greatest possible extent.

After the sealing or partition member 9 has passed the exhaust port 13, exhaust of the combustion gases is initiated with the completion of the exhaust terminating one cycle of the rotary engine. Consequently, in this way, the combustion gas works to repeat this cycle.

Figure 3:
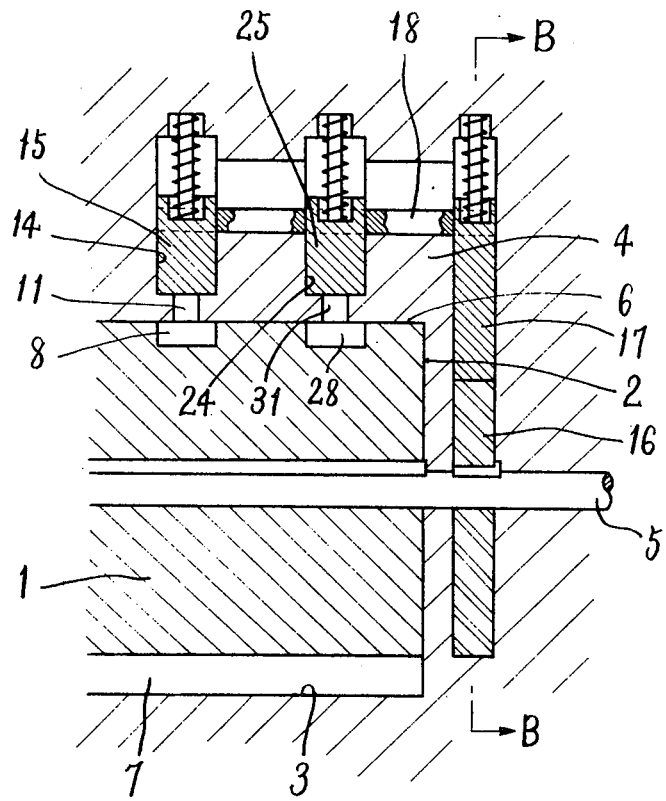
FIG. 3 is a cross-sectional view taken along line A—A in FIG. 2.
Figure 4:
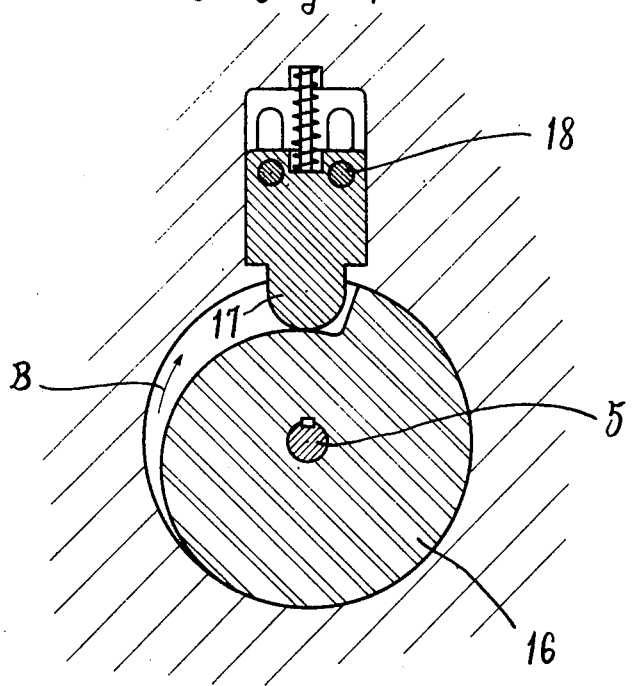
FIG. 4 is a cross-sectional view taken along line B—B in FIG. 3.

Within the area of sliding contact between the rotor 1 and the peripheral wall 3 during the cycle described hereinabove, additional air or the like is supplied through the supply port 31 to the cavity 28 which, as more clearly illustrated in FIG. 3, is separate from the cavity 8. When the cavity 28 comes to the position of space 7, before or after ignition and explosion, the additional air or the like is released into the space 7 and acts upon the expanded combustion gas. In the case where the additional air is introduced into the space before explosion, the cavity 28 is so formed as to precede the cavity 8.

As apparent from the above description, the advantages of the rotary engine according to the present invention are considerable. Specifically, the rotor 1 and the combustion chamber 2 have such a structural relationship that the rotor 1 precisely circular in section is adapted for sliding contact, over a requisite predetermined length of its circumferential surface 6, with the part of the peripheral wall 3 of the combustion chamber which part has the same size as the circumference of the rotor 1, with the rest of the peripheral wall having a greater size than the circumference of the rotor 1 to provide a space 7 where the rest of the length of the circumferential surface 6 of the rotor 1 is always out of sliding contact with the peripheral wall 3. Accordingly, the construction is simple in shape and assures smooth rotation without objections since the rotor is not designed for eccentric rotation.

In as much as the fuel-air mixture accommodating cavity 8 is adapted to communicate with the intake port 11 at the position where the rotor 1 is in sliding contact with the peripheral wall 3 of the combustion chamber 2 to admit the fuel-air mixture into the cavity 8, the fuel-air mixture can be supplied effectively and hermetically during the rotation of the rotor 1.

Furthermore, the cavity 8, which is formed in a part of the circumferential surface 6 of the rotor 1, easily communicates with the ignition port 12 formed in the peripheral wall 3. The cavity 8 is made to communicate with the space 7 when brought to the position of the space 7 where the rotor 1 is always kept out of contact with the peripheral wall 3. In this way, the rotating rotor 1 itself serves as a type of a valve thereby eliminating the necessity to use complex valve means resulting in a simplification of the overall construction of the rotary engine. Similarly, for the exhaust port 13, the rotor 1 having the sealing or partition member 9 disposed therein functions as a valve by virtue of its rotation.

Moreover, unlike conventional engines of the reciprocating type, in the present invention, the ignition portion 12 will not be exposed to the cold fuel-air mixture for any considerable length of time and, consequently, can be adapted to be maintained in a red-hot state all the time by using a heat accumulating material. Accordingly, electrical ignition is needed only at the initial stage. Furthermore, piezo-electric element is effectively useable although the serviceable life thereof may be limited.

By providing the cavity 28 in the circumferential surface 6 of the rotor 1 separately from the fuel-air mixture accommodating cavity 8 to retain additional air or the like to dilute the fuel-air mixture and to release the same before or after explosive combustion, a fuel-air mixture of high concentration, even if stored in the cavity 8, can be combusted again without permitting carbon monoxide and hydrocarbons to be left over.

Additionally, since the amount of the fuel-air mixture to be ignited can be reduced according to the present invention, nitrogen oxides, which will be generated at a high temperature, can be minimized thereby promoting complete combustion and eliminating emissions entailing air pollution.

Furthermore, it is also possible to introduce water, alcohol or the like into the cavity 28 to utilize the resulting water vapor or to use the hydrogen and oxygen derived from the decomposition of the water for recombustion. Consequently, with the rotary engine of the present invention, the energy resulting from combustion can be sustained and effectively utilized. As is the case with the cavity 8, the rotor 1 itself serves as a valve for the cavity 28 since it is formed in the circumferential surface 6 thereby resulting in a construction which is much simpler than the conventional constructions for supplying secondary air.

Figure 5:
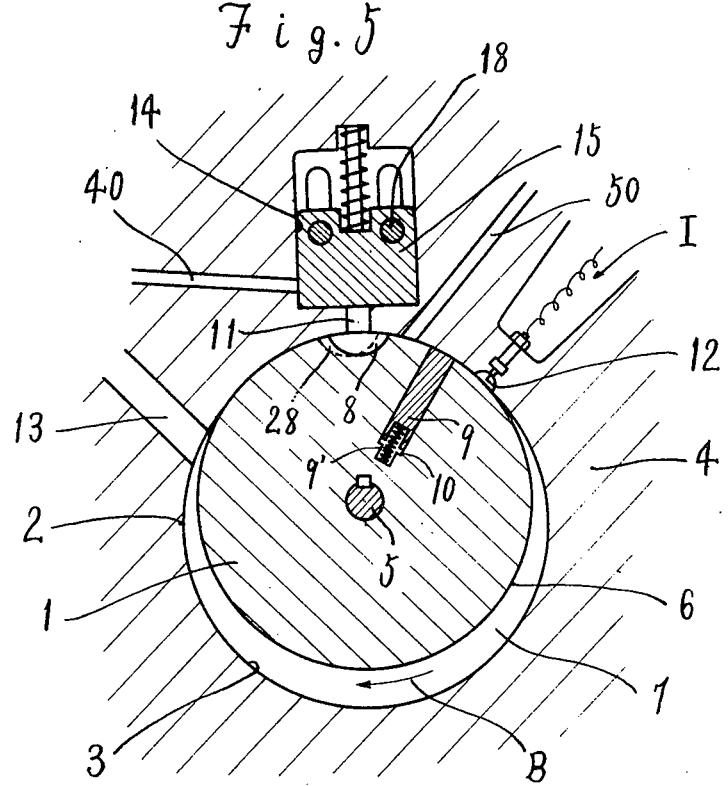
FIGS. 5 through 7 are front cross-sectional views showing additional embodiments of the rotary engine according to the present invention.

In the embodiment according to FIG. 5, the intake port 11 serves as an air intake port communicating with an air supply passage 40 through the chamber or compartment 14 and a fuel injection port 50 is provided between the intake port 11 and the ignition port 12 in the peripheral wall 3. The cavity 8 in the rotor 1 is adapted to reach the position of the intake port 11 and then that of the fuel injection port 50 whereby air and fuel are supplied to the cavity 8 in succession to produce a fuel-air mixture in the cavity 8. Additionally, in the embodiment of FIG. 5, the distance between the fuel injection port 50 and the ignition port 12 must be greater than the width of the cavity 8. The fuel injection port 50 and the ignition port 12 are operable by suitable cam means (not shown).

Figure 6:
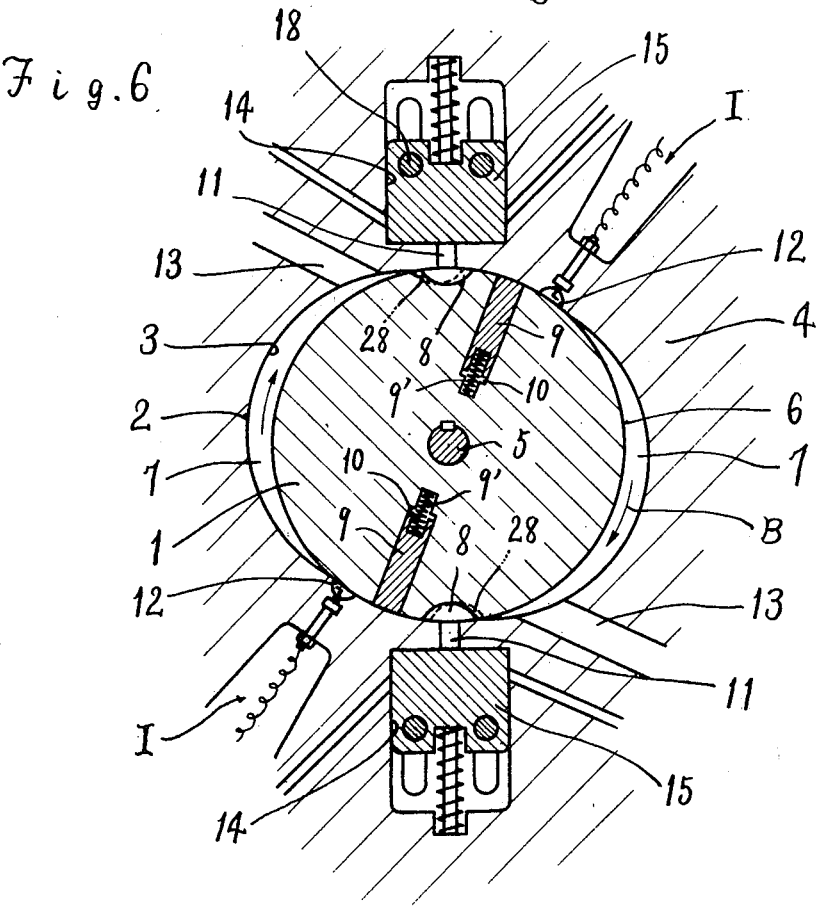

According to the embodiment of FIG. 6, a pair of spaced portions of the peripheral wall 3 of the combustion chamber 2 have the same circumference as the circumference of the rotor 1 with the remaining portions of the wall 3 having a circumference greater than the circumference of the rotor 1. Consequently, two spaces 7 are provided where the circumferential surface 6 of the rotor 1 is out of sliding contact with the peripheral wall 3.

Additionally, the embodiment of FIG. 6 is provided with a pair of spaced fuel-air mixture accommodating cavities 8, additional air accommodating cavities 28, intake ports 11, ignition ports 12, exhaust ports 13, supply ports 31, and sealing or partition members 9 thereby resulting in an arrangement in which ignition and explosion occurs four times during one revolution of the rotor 1.

Figure 7:
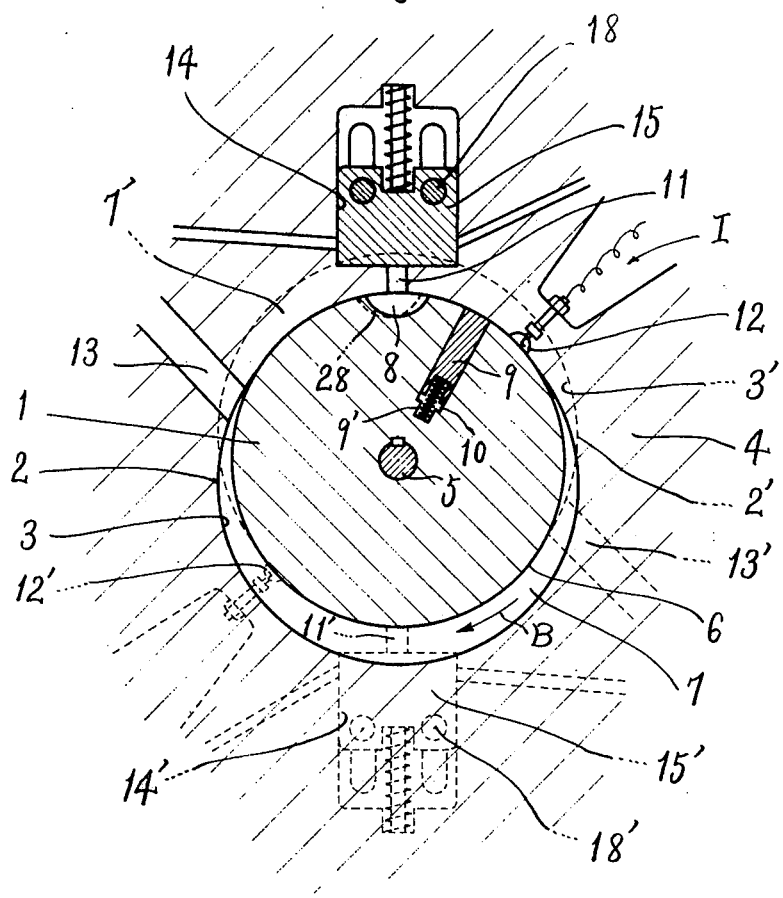

In the embodiment according to FIG. 7, a second rotor is disposed coaxially with the rotor 1 in a second combustion chamber 2' of the casing 4 with an intake port 11' communicating with chamber or compartment 14' and an intake port 12' being provided in the wall 3' of the second chamber 2' whereby both rotors perform alternate ignition and explosion in their respective combustion chambers 2, 2'.

Figure 8:
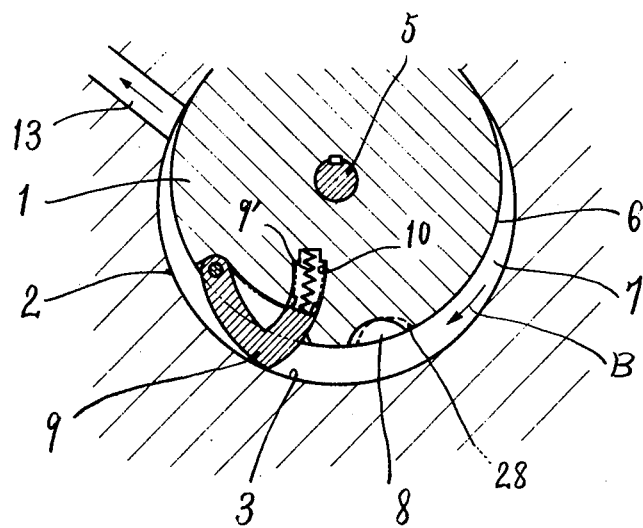
FIG. 8 is a partial front cross-sectional view showing a further embodiment of a sealing or partition member on a rotor according to the present invention.

According to the embodiment of FIG. 8, a substantially V-shaped sealing or partition member 9 is provided on the rotor 1. The projecting end of the member 9 is normally biased into sliding contact with the peripheral wall 3 of the combustion chamber 2 at all times by the spring 9'. The end portion of the member 9 may be made of an alloy having high resistance to abrasion.

Figure 9:
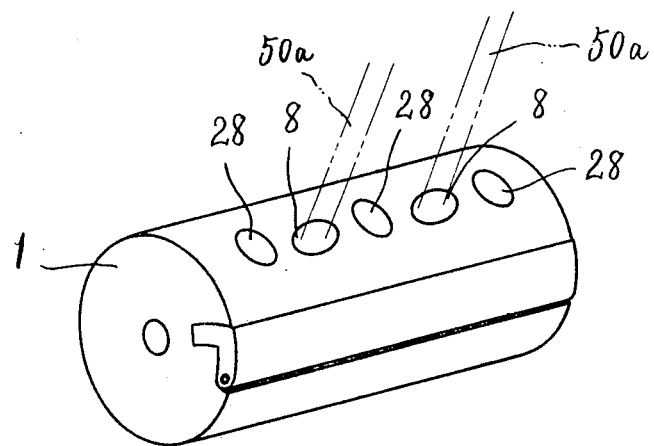
FIGS. 9 and 10 are perspective views showing further embodiments of a rotor according to the present invention.

Additionally, the embodiment of FIG. 5 may be further modified such that at least two fuel-air mixture accommodating cavities 8 may be provided in the rotor 1 as shown in FIG. 9, with fuel injection ports 50a, schematically illustrated in phantom lines, communicating therewith, respectively.

Figure 10:
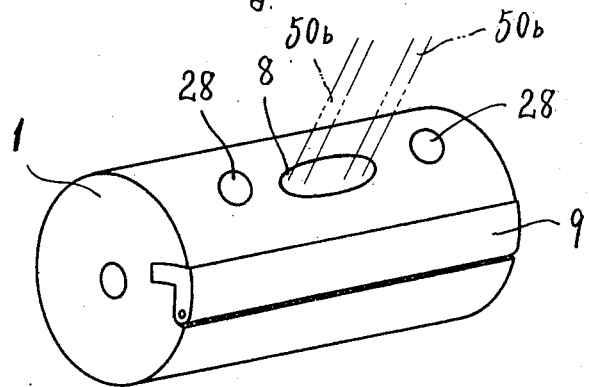

According to the embodiment of FIG. 10, at least two fuel injection ports 50b may be provided to communicate with one cavity 8 with the fuel being injected alternately through the two ports 50b, whereby the interval of injection through each of the injection ports can be at least double. This embodiment assures accurate injection of the fuel in proper relation to the rotation of the rotor 1 even when it is driven at a high speed.

It is of course possible in any of the foregoing embodiments to provide additional sealing means to improve the hermetic sliding contact between the rotor 1 and the peripheral wall 3. Furthermore, the center shaft 5 of the rotor 1 may be of a hollow construction to permit the passage of water, air or the like through the shaft whereby the roller 1 can more easily be cooled. Additionally, the pusher cam 15 for the intake of mixture or air may be replaced by compressing means coupled to a compressor or the like. Furthermore, the cavity 8 provided in the circumferential surface 6 of the rotor 1 may be lined with a sintered refractory attached thereto by suitable means to impart improved heat insulation to the cavity 8 thereby utilizing the heat retaining effect of the cavity 8 for heat accumulating ignition of the fuel-air mixture once the engine is initiated into operation.

While I have shown and described several embodiments in accordance with the present invention, it is understood that the same is not limited thereto but is susceptible to numerous changes and modifications as known to a person skilled in the art, and I therefore do not wish to be limited to the details shown and described herein but intend to cover all such changes and modifications as are encompassed by the scope of the appended claims.

What I claim is:

1. A rotary engine comprising: a casing, a combustion chamber formed in said casing, a rotor means having a circular outer surface disposed in said combustion chamber, said combustion chamber including at least one peripheral wall portion equal to the circumference of said circular outer surface of said rotor means and at least one second peripheral wall portion greater than the circumference of said circular outer surface of said rotor means, fuel intake means disposed in said first peripheral wall portion for supplying fuel to the engine, ignition means spaced from said fuel intake means and disposed in said first peripheral wall portion, exhaust means disposed in said second peripheral wall portion for exhausting combustion gases from the engine, means for rotatably mounting said rotor means in said combustion chamber to permit said circular outer surface of said rotor means to be in sliding hermetic contact over a predetermined length of said first peripheral wall portion and spaced from said second peripheral wall portion, means on said circular outer surface of said rotor means for accommodating the fuel supplied by said fuel intake means, means for sealing the space between said circular outer surface and said second peripheral wall portion from the exhaust means for a predetermined rotation of said rotor means, said means for accommodating the fuel includes a partial recess in said circular outer surface of said rotor defining a cavity, said sealing means includes at least one partition member movably mounted on said rotor means, said partition member having one end portion in sliding contact with said peripheral wall portions of said combustion chamber, said partition means is movably mounted on said rotor means forwardly of said cavity in the direction of rotation of said rotor means and means on said rotor for diluting the fuel supplied to the engine.

2. An engine according to claim 1, wherein said means for diluting the fuel includes a partial recess provided in said circular outer surface of said rotor means spaced from said first mentioned partial recess and defining a second cavity, said second cavity accommodating additional air and supplying the same to the space between said circular outer surface and said second peripheral wall portion, and wherein means are provided for supplying the additional air to said second cavity.

3. An engine according to claim 1, wherein means are provided for normally biasing said sealing means into sliding contact with said peripheral wall portions of said combustion chamber.

4. An engine according to claim 2, wherein said means for supplying additional air includes a supply port disposed in said first peripheral wall portion.

5. An engine according to claim 1, wherein said fuel intake means includes an air intake port, and wherein means are provided for directing a compressed fuel-air mixture into said cavity including an injection port formed in said first peripheral wall portion between said air intake port and said ignition means, said injection port communicating with said cavity during rotation of said rotor means.

6. An engine according to claim 1, wherein said combustion chamber includes a pair of first peripheral wall portions disposed on opposite sides thereof and a pair of second peripheral wall portions interconnecting respective ends of said first peripheral wall portions, said mounting means for said rotor means permitting said circular outer surface of said rotor means to be in sliding hermetic contact with each of said first peripheral wall portions and spaced from each of said second peripheral wall portions, and wherein a fuel intake means and ignition means are disposed in each of said first wall portions, said rotor means including a pair of spaced sealing means, and wherein an exhaust port is disposed in each of said second wall portions.

7. A rotary engine according to claim 1, wherein at least a pair of combustion chambers are provided, each of said combustion chambers having a rotor means disposed therein, said rotor means being coaxially disposed on said mounting means and wherein said first peripheral wall portions of each combustion chamber are diametrically opposed to each other whereby said rotor means effects alternate ignition and explosion in the respective combustion chambers.

8. A rotary engine comprising: a casing, a combustion chamber formed in said casing, a rotor means having a circular outer surface disposed in said combustion chamber, said combustion chamber including at least one peripheral wall portion equal to the circumference of said circular outer surface of said rotor means and at least one second peripheral wall portion greater than the circumference of said circular outer surface of said rotor means, the ends of said first and second peripheral wall portions merging at first and second transitional wall areas, said first and second transitional wall areas being spaced from each other in the direction of rotation of said rotor means, fuel-air intake means disposed in said first peripheral wall portion for supplying a fuel-air mixture to the engine, ignition means spaced from said fuel-air intake means and disposed in said first peripheral wall portion, exhaust means disposed in said second peripheral wall portion at said second transitional wall area for exhausting combustion gases from the engine, means for rotatably mounting said rotor means in said combustion chamber to permit said circular outer surface of said rotor means to be in sliding hermetic contact over a predetermined length of said first peripheral wall portion and spaced from said second peripheral wall portion, a cavity disposed on said circular outer surface of said rotor means for accommodating the fuel-air mixture supplied by said fuel-air intake means, at least one radially directed slot means provided in said rotor means forwardly of said cavity in the direction of rotation of said rotor means, a sealing element movably mounted in said radially directed slot means having one end portion in sliding contact with said peripheral wall portions of said combustion chamber for sealing the space between said circular outer surface and said second peripheral wall portion from the exhaust means for a predetermined rotation of said rotor means, said fuel-air intake means including means for compressing the fuel-air mixture and means for directing said compressed fuel-air mixture into said cavity disposed on said rotor means, said sealing element is substantially V-shaped and has a projecting end in sliding contact with said peripheral wall portions of said combustion chamber, the end of one leg of said V-shaped partition member being hingedly connected with the outer surface of said rotor means and the other leg of said V-shaped partition member being movably received in said radially directed slot means.

9. A rotary engine according to claim 5, wherein a plurality of cavities are provided, each of said cavities alternatingly communicating with said injection port whereby alternate injection is effected.

10. A rotary engine according to claim 5, wherein a plurality of injection ports are provided, each of said injection ports communicating with said cavity whereby alternate injection is effected.

11. A rotary engine according to claim 1, wherein said fuel intake means includes a chamber means for retaining a predetermined amount of the fuel, and wherein a compressor means is provided for compressing the fuel including means for forcing said predetermined amount of fuel into said cavity.

12. A rotary engine according to claim 11, wherein said means for forcing includes displaceable cam means, said cam means being displaced by a further cam means operatively connected with said rotor means.

13. A rotary engine according to claim 8, wherein said projecting end includes an alloy having a high resistance to abrasion.

14. A rotary engine according to claim 1, wherein said cavity is lined with a means for improving heat insulation.

15. A rotary engine according to claim 1, wherein said means for rotatably mounting said rotor means includes a hollow shaft.

16. A rotary engine according to claim 1, wherein means are provided for improving the hermetic sealing between said rotor means and said first peripheral wall portion.

17. A rotary engine according to claim 2, wherein said means for supplying additional air to said second cavity includes means for supplying water to said second cavity.

18. An engine according to claim 2, wherein a third cavity is provided in said circular outer surface of said rotor means spaced from said first and second cavities and means are provided for supplying water to said additional cavity.

* * * * *

UNITED STATES PATENT OFFICE
CERTIFICATE OF CORRECTION

Patent No. 3,987,762　　　　　　　Dated　October 26, 1976

Inventor(s)　　　　　Ryosaku SAWADA

It is certified that error appears in the above-identified patent and that said Letters Patent are hereby corrected as shown below:

Between lines [21] and [52], insert the following:

[30]　　　Foreign Application Priority Data
　　　March 30, 1973　Japan................48-36506

Signed and Sealed this

Twenty-first Day of June 1977

[SEAL]

Attest:

RUTH C. MASON
*Attesting Officer*

C. MARSHALL DANN
*Commissioner of Patents and Trademarks*